US005512914A

United States Patent [19]

Hadzoglou et al.

[11] Patent Number: 5,512,914

[45] Date of Patent: Apr. 30, 1996

[54] ADJUSTABLE BEAM TILT ANTENNA

[75] Inventors: James Hadzoglou, Mayfield Heights; Michael E. Warner, Cleveland Heights; Harold E. Stevens, Lyndhurst, all of Ohio

[73] Assignee: Orion Industries, Inc., Cleveland, Ohio

[21] Appl. No.: 370,451

[22] Filed: Jan. 9, 1995

Related U.S. Application Data

[63] Continuation of Ser. No. 895,552, Jun. 8, 1992, abandoned.

[51] Int. Cl.$^6$ .......... H04Q 21/00

[52] U.S. Cl. .......... 343/816; 343/792; 343/830

[58] Field of Search .......... 343/790, 791, 343/792, 800, 823, 827, 830, 844, 890, 891, 894, 816

[56] References Cited

U.S. PATENT DOCUMENTS

| | | | |
|---|---|---|---|
| 2,486,597 | 11/1949 | Greene | 343/792 |
| 3,623,113 | 11/1971 | Faigen et al. | 343/823 |
| 3,750,181 | 7/1973 | Kuecken | 343/790 |
| 4,460,896 | 7/1984 | Shmitka | 343/894 |
| 4,907,008 | 3/1990 | Dienes | 343/890 |

FOREIGN PATENT DOCUMENTS

| | | |
|---|---|---|
| 0411363A2 | 7/1990 | European Pat. Off. . |
| WO8204356 | 12/1982 | WIPO . |

OTHER PUBLICATIONS

Vehicular Technology Society 42nd VTS Conference Frontiers of Technology; Electrical Downtilt Through Beam–Steering Versus Mechanical Downtilt; Gary Wilson; Feb. 1992 pp. 1–4.

Proceedings of the National Communications Forum; Antenna Pattern Considerations in Optimizing Cellular RF Designs; Michael E. Maragoudakis; Sep. 30–Oct. 2, 1991 pp. 624–630.

International Symposium; Low Sidelobe and Tilted Beam Base–Station Antennas for Smaller Cell Systems; Yamada and Kijima; IEEE Catalog No. CH 2654–Feb. 1989; Jun 26–Jun. 30, 1989 pp. 1–4.

*Primary Examiner*—Donald T. Hajec
*Assistant Examiner*—Tan Ho
*Attorney, Agent, or Firm*—Dressler, Goldsmith, Shore & Milnamow, Ltd.

[57] ABSTRACT

An omni-directional, collinear, vertical base station antenna having an adjustable or variable radiation beam tilt capability. Terminations at the drive or feed points are provided by an adjustable, capacitive coupling structure at the feed points between the conductive elements of a feed structure and a radiator assembly for adjusting the physical position of the feed points and thereby the phase of the feed points relative to the upper and lower portions of the antenna to alter the deflection angle of the radiation produced. A signal feed, having first and second conductive feed elements, is connectable to a signal feed line to couple a signal between the feed line and the radiator assembly. An adjustable support and control mechanism supports said elongated radiator assembly and said signal feed for relative movement therebetween to effect selective adjustment of the feed points of said capacitive coupling structure along the length of said elongated di-pole radiator assembly to thereby effect adjustment of the beam angle of the radiation pattern.

17 Claims, 4 Drawing Sheets

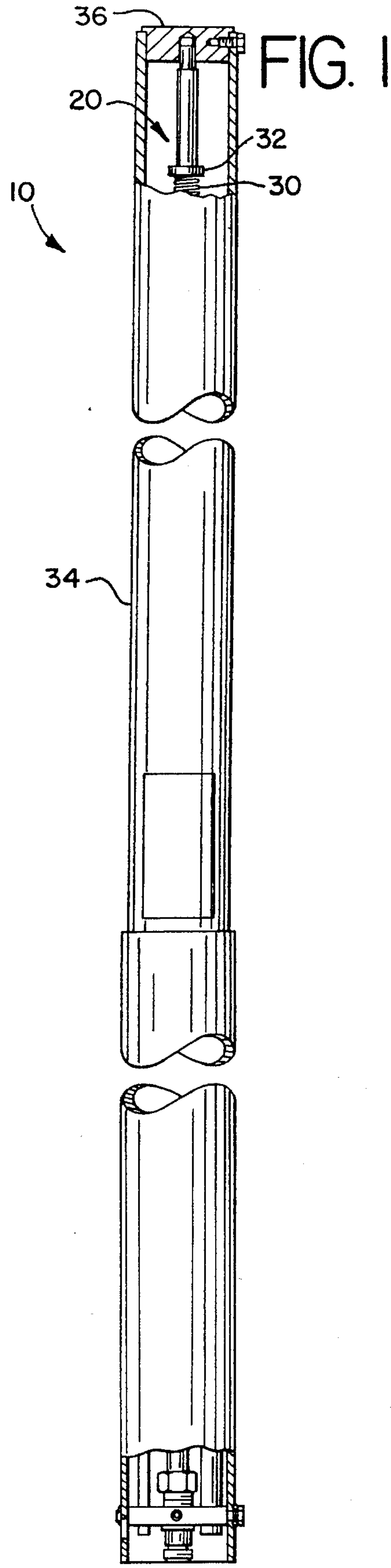
FIG. 1
FIG. 2
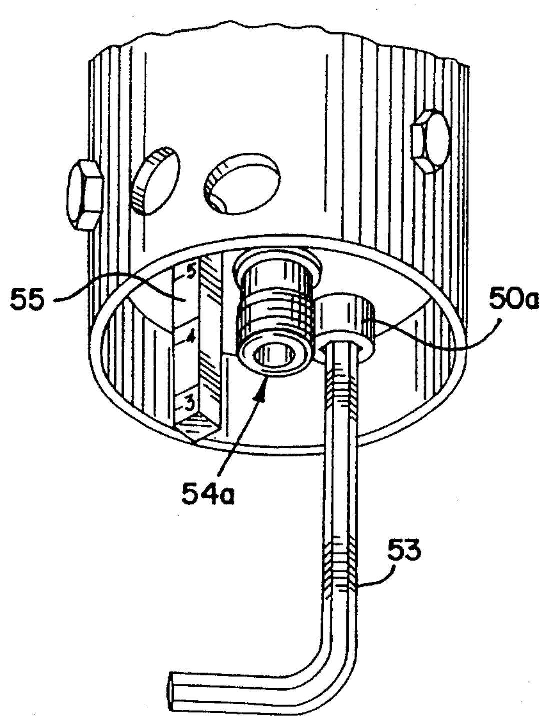
FIG. 3
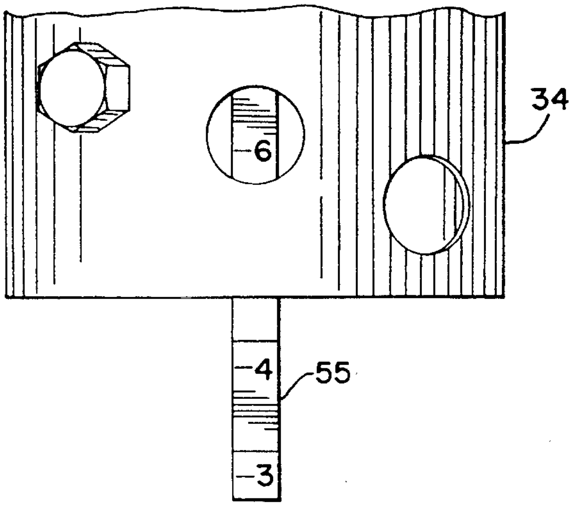

ADJUSTABLE BEAM TILT ANTENNA

This is a continuation of application Ser. No. 07/895,552, filed Jun. 8, 1992, now abandoned.

FIELD OF THE INVENTION

The present invention relates to antennas and, more particular, to cellular frequency base station antennas.

BACKGROUND OF THE INVENTION

Many base station antennas used for commercial communications, e.g., cellular service, are omni-directional. One such cellular base station antenna is a co-axial, sleeve dipole collinear vertical antenna array manufactured by The Antenna Specialists Co., a division of Orion Industries, Inc., the assignee of this application. This type of antenna includes a stacked array of elongated radiators, e.g., a "dumbbell" like sections, which constitute a vertical array of collinear sleeve dipole radiators. The array is center fed by a concentric co-axial feed structure.

At the approximate center of the stacked antenna array, the co-axial feed structure is terminated by connection to the adjacent one of the intermediate radiating elements. The location of the feed point affects desired phasing relative to propagation through the stacked dipole radiator array above and below the feed point connection. By changing the location of the tap or connection points to the array, the beam tilt of the major lobe can be controlled. In this way, antennas have been constructed with different amounts of downward or negative beam tilt, typically at angles of between about −3° and about −8°.

Good radiation coverage from such antennas results not only from an appropriate gain antenna, but also is a function of directing radiation into areas where coverage is desired. Since, for example, antennas for cellular service are typically used for short distance communications with mobile units located below the antenna site, downwardly directed beams having negative beam angles, are normally utilized. As is known, controlling the phasing of the elements of the stacked array is effective to aim the vertical beam downwardly at an angle relative to the horizontal. The feeding of spaced dipole elements with controlled phase variances electrically tilts the beam downwardly at an angle to the axis of the radiators to effectuate the desired coverage.

Different antenna sites or installation locations may advantageously utilize antennas producing radiation patterns having different downward beam tilt angles. Factors bearing on beam angle selection include position, height, and the environment in which the antenna is operating. Thus, different downward beam tilt angles may be appropriate for an antenna installed in an urban area in a relatively high position and an antenna installed in a less populated area at a different height.

Different antennas with different beam angles have been used where different beam tilt is desired. Each such antenna is designed and constructed to provide a single selected beam tilt angle.

It would be desirable to be able to provide an antenna with a variable beam tilt capability which would have the flexibility of adjustable beam tilt and yet be simple to set up and adjust both prior to or after the antenna is installed.

SUMMARY OF THE INVENTION

In accordance with the present invention, there is provided an antenna, used primarily as a base station antenna, having an adjustable or variable radiation beam tilt capability which enables tailoring of coverage areas for each installation location. One embodiment of such an antenna takes the form of an omni-directional, collinear, vertical base station antenna. The convenience of an easily adjustable beam tilt antenna is evident, particularly, as is the case with antennas incorporating the present invention, if the beam can be adjusted without the addition of added components, and before and after installation without requiring removal of any components such as, e.g., a radome, cover or other protective elements.

In accordance with the present invention, an antenna assembly is provided in which the terminations at the drive or feed points are provided by an adjustable coupling, such as an adjustable capacitive coupling device. In order to avoid electrical noise that might result from the use of sliding contacts or other multi-position conductive connections, the antenna incorporating the present invention utilizes adjustable capacitive coupling at the feed points between the conductive elements of the feed structure and the radiator assembly. An antenna incorporating the present invention thus is capable of adjusting the physical position of the feed points and thereby the relative phase of the signal feed relative to the upper and lower portions of the antenna to alter the beam or deflection angle of the radiation produced.

An antenna assembly incorporating the present invention is capable of producing a radiation pattern having a selected, desired beam radiation angle and of varying the beam angle of said radiation pattern. An antenna assembly in accordance with one aspect of the present invention, may take the form of an elongated dipole radiator assembly having two ends, e.g., an omni-directional collinear vertical antenna comprised of a stacked array of elongated radiating elements. One of the ends of the elongated dipole radiator assembly may be a signal feed end.

Such an antenna assembly includes signal feed means connectable to a signal feed line for coupling a signal between the feed line and the elongated dipole radiator assembly. The signal feed means includes a feed structure having first and second conductive feed elements. The first conductive feed element has an end located at an adjustable feed point between the opposite ends of the elongated dipole radiator assembly. The second conductive feed element has portions located at additional adjustable points adjacent the opposite ends of the elongated dipole radiator assembly. This co-axial feed structure is concentric within the radiator, and provides an adjustable feed point near the center of the elongated radiator assembly.

Such an antenna assembly also includes first coupling means for capacitively coupling the end of the first conductive feed element to the elongated dipole radiator assembly at the adjustable feed point, and additional coupling means for capacitively coupling the second conductive feed element to the elongated dipole radiator assembly at the additional adjustable points adjacent the opposite ends thereof. Adjustable support means supports the elongated dipole radiator assembly and the feed means for relative movement therebetween to effect selective adjustment of the feed points of the capacitive coupling means along the length of the elongated dipole radiator assembly to thereby effect adjustment of the beam angle of the radiation pattern.

An antenna utilizing the simple physical structure and the capacitive coupling at the feed point permits the construction of the adjustable control mechanism to be readily accessible both before and after installation of the antenna to permit convenient adjustment of the beam tilt without alteration of the physical structure of the antenna itself and without the use of additional components for altering the feed point position.

Thus, in accordance with the present invention, there is provided an elongated antenna assembly, such as a collinear stacked array of radiating elements. The connection to the feed structure is made at the approximate center of the antenna array to one of a plurality of radiating elements making up the array. The point of coupling provides the desired lag or lead phase conditions relative to propagation through the dipole radiator assembly to opposite ends of the radiator assembly from the feed point. By adjusting the relative phasing, the angular relationship or deflection of the radiation beam can be varied.

The capacitive connection of the feed means to the radiator assembly is provided by an adjustable bearing and coupling structure. This structure provides desired physical support for the feed structure and between the feed structure and the antenna array, while simultaneously providing a capacitive electrical connection between the feed means at the feed point of the radiator as well as at the return ends of the radiator assembly. The bearing structures, including the capacitive coupling between the feed point and the radiator assembly, are slidably positioned within the radiator assembly and are free to move axially relative thereto. By effecting a relative movement between the feed means and the radiator assembly, e.g., the array of elongated radiating elements, the feed point and therefore the beam angle or tilt can be adjusted.

In one embodiment of an antenna assembly incorporating the present invention, the antenna array is assembled with a biasing means at the free end thereof biasing the array toward the coupling or feed end of the antenna structure. The coupling or feed end of the antenna array is slidably supported relative to the feed means disposed therewithin. The antenna array is connected to an adjustable support assembly or mechanism which is operative to effectuate relative axial movement of the array relative to the feed means to effectuate adjustment of the position of the feed point coupled to the array.

More specifically, in one embodiment of an antenna incorporating the present invention, the coupling end of the element stack or antenna array, the end adjacent the connection to the feed cable, is threadably supported on a drive block assembly forming part of an adjustable support assembly. The rotation of a drive shaft forming part of the adjustable control mechanism which is threaded to the element stack or antenna array, effects axial adjustment thereof relative to the feed means. An indicator mounted to the element stack can be observed and may be calibrated to reflect the effective beam tilt for the various positions of the antenna radiating stack relative to the feed means.

Numerous other advantages and features of the present invention will become apparent from the following detailed description of the invention and the embodiments thereof, from the claims, and from the accompanying drawings in which the details of the structure and body of the invention are fully and completely disclosed as a part of this specification.

BRIEF DESCRIPTION OF THE DRAWINGS

FIG. 1 is an elevational view of an antenna assembly incorporating the present invention partially broken away and with portions omitted for purpose of illustration to show the opposite ends of an antenna assembly;

FIG. 2 is a perspective view of the coupling or feed end of the antenna assembly;

FIG. 3 is a partially enlarged side view of the coupling or feed end of the antenna assembly;

DETAILED DESCRIPTION

Figure 4:
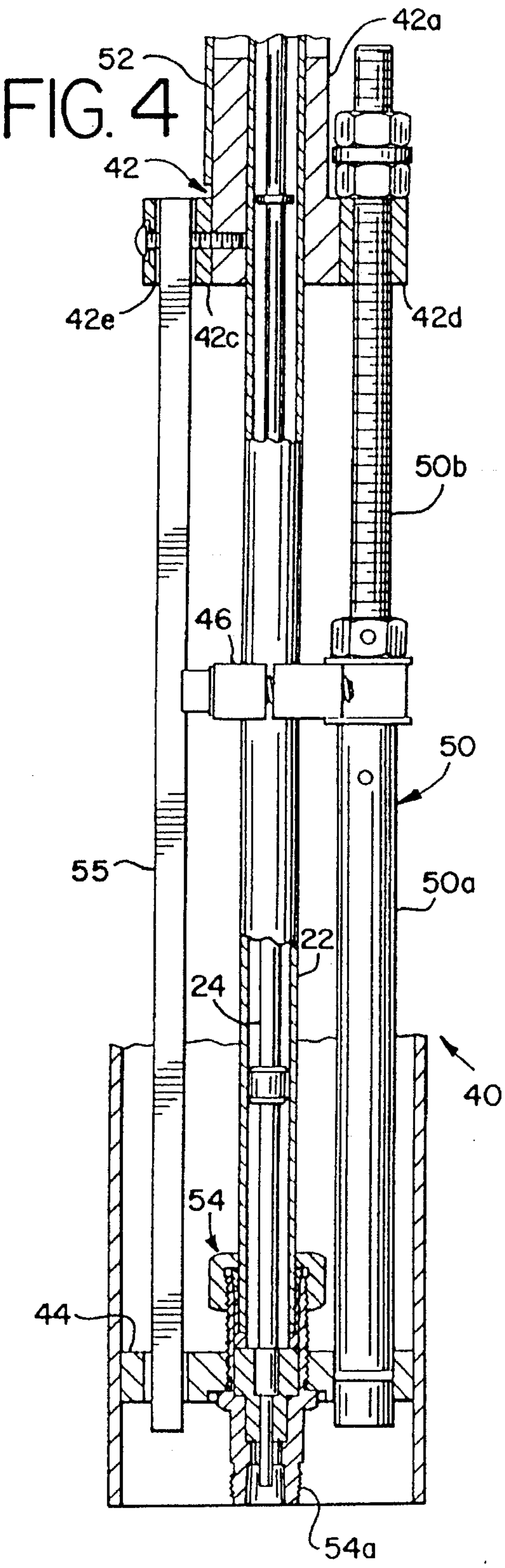
FIG. 4 is a partial view of the coupling or feed end of the antenna assembly showing an adjustable support and control mechanism in one position.

While this invention is susceptible of embodiment in many different forms, there is shown in the drawing and will be described herein in detail a specific embodiment thereof with the understanding that the present disclosure is to be considered as an exemplification of the principles of the invention and is not intended to limit the invention to the specific embodiment illustrated.

Antennas incorporating the present invention may be designed to operate over the cellular band, e.g., about 824 to about 896 Mhz, and to exhibit a gain of about 8.5 Db and a VSWR less than or equal to about 1.5:1 over the indicated frequency range. Such an antenna is intended to achieve a variable beam tilt of between about −3° and about −8° achieved by simple mechanical adjustments.

Figure 7:
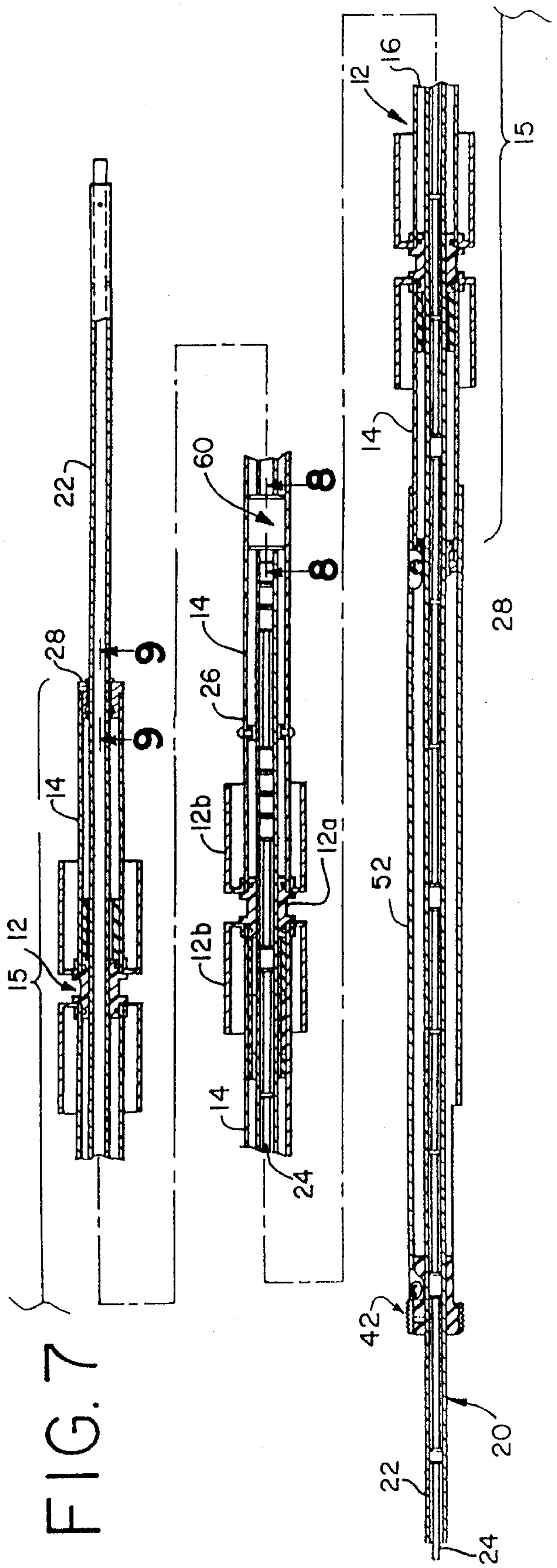
FIG. 7 is an enlarged sectional view along the lines 8—8 of FIG. 7 showing the radiator array and the feed structure of an antenna system incorporating the present invention with portions omitted for purpose of illustration to show the opposite ends of an antenna array.

The antenna assembly 10 incorporating the present invention includes a plurality of radiating half-wave sleeve dipole elements 12 (FIG. 7). Each of the radiating elements 12 takes the form of a "dumbbell" shaped annular structure including a pair of enlarged radiating elements or end portions **12*b*. Each pair of enlarged end portions 12*b* are interconnected, mechanically spaced apart, and electrically insulated from each other by a generally tubular central non-conducting portion 12*a*. An omni-directional collinear radiating assembly in the form of a stacked array 15 of elongated radiating half-wave elements 12 is formed by electrically and physically interconnecting adjacent enlarged radiating elements 12*b* with conductive tubular portions 14, as shown. The stacked array 15 of elongated radiating half-wave elements 12 has an axial bore 16** extending the length thereof.

A co-axial feed structure 20 passes through the bore 16 of the stacked radiating array 15. The coaxial feed structure 20 includes an outer annular feed conductor or conductive feed element 22 and an inner feed conductor or conductive feed element 24 disposed co-axially within, and fixed relative to, the outer feed element 22. The annular outer feed element 22 extends substantially the entire length of the array 15. A plurality of annular conductive rings 26 are disposed along the length of the stacked radiating array 15 to allow for proper impedance matching between the outer annular feed element and the stacked radiating array 15, while permitting relative axial movement therebetween. As shown in FIG. 7, the annular conductive rings 26 are mechanically and electrically connected at spaced locations to the inner surface of the conductive tubular portions 14, with the inner diameter of the annular conductive rings 26 being larger than, and spaced from, the outer diameter of the outer feed element 22. The use of annular conductive rings in such stacked arrays is a known technique and does not form part of the present invention.

The outer annular feed element 22 extends past both ends of the stacked radiating array 15, which is provided with appropriate end caps or end members 28. Biasing means in the form of a compression spring 30 is disposed between the end of the array 15 and a stop member 32 attached to the end of the outer feed element 22 to bias the feed structure 20 and the stacked radiating array 15 in opposite directions relative to each other. The stacked radiating array 15 and the feed structure 20 are housed within an appropriate radome or protective sheath 34. An end cap 36 closes the free end of the radome 34 to complete the protective closure for the entire assembly. The end cap 36 also supports the free end of the feed structure 20.

Figure 5:
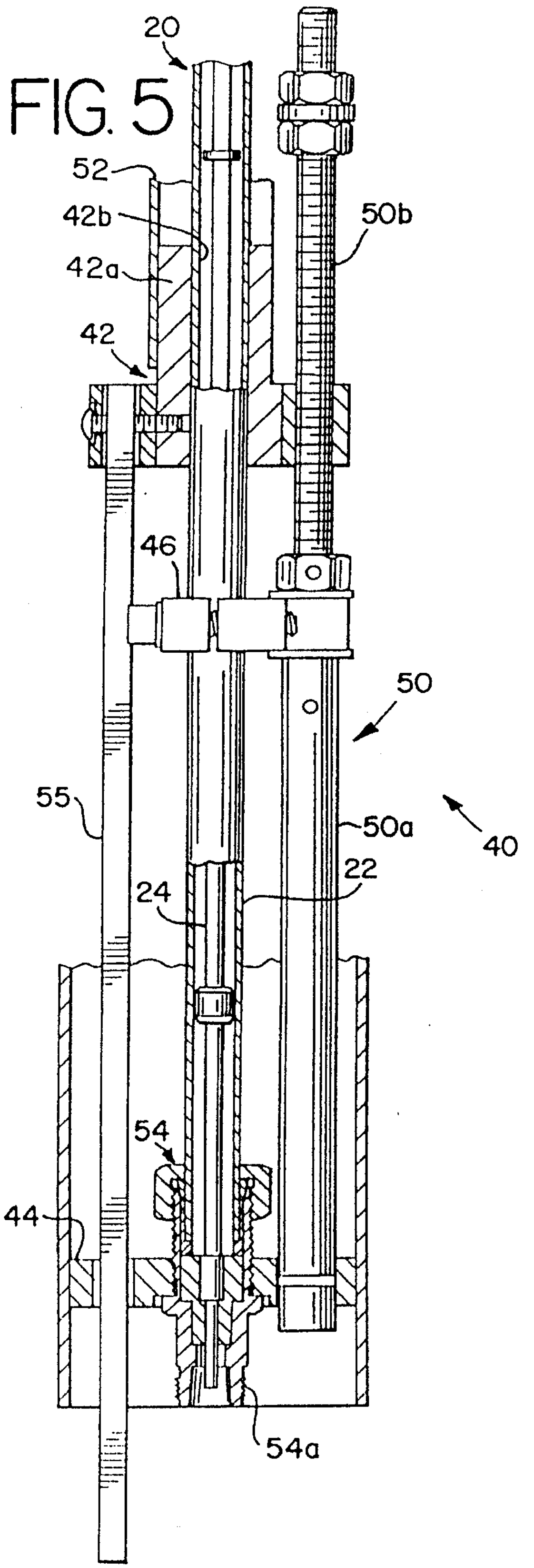
FIG. 5 is a partial view of the coupling end of the antenna assembly showing the adjustable support and control mechanism of FIG. 4 in a second position.

As shown in FIGS. 4 and 5, the inner or feed ends of the stacked antenna array 15 and the feed structure 20 are supported for relative movement to each other by an adjustable support and control mechanism 40. The adjustable support and control mechanism 40 includes a support collar 42, a base support block 44, an intermediate support block 46, a drive shaft 50 including a housing 50*a*, and a threaded extension 50*b*.

The support collar 42 includes an annular sleeve portion 42*a* having a bore 42*b*. The annular sleeve portion 42*a* is inserted into an extension 52 attached to the feed or inner end of the stacked antenna array 15. The inner end of the support collar 42 is formed with an enlarged flange portion 42*c* which includes a pair of diametrically opposed apertures 42*d*, 42*e*. The flange portion 42*c* is formed integrally with the sleeve portion 42*a*. One of the apertures 42*d* is threaded and provides a threaded connection with the threaded drive shaft extension 50*b*.

The conductive feed structure 20 including the outer annular feed element 22 and the inner feed element 24 extends beyond the end of the stacked antenna array 15 and passes through the bore 42*b* of the support collar 42 and is slidably supported therein. The free end of the feed structure 20 terminates in an appropriate connector such as a co-axial connector assembly 54 attached to the base or connector support block 44. The connector assembly includes a typical co-axial connector 54*a* for connecting the feed structure 20 to an appropriate feed line as is well known.

The drive shaft support housing 50*a* is rotatably supported in the base support block 44 and in the intermediate support block 46 which is affixed, e.g., clamped, to the outer annular feed element 22. The drive shaft support housing 50*a* receives the threaded drive shaft extension 50*b*. The free end of the drive shaft extension 50*b* is threaded in aperture 42*d* of the support collar 42. Rotation of drive shaft 50 effects axial movement of the support collar 42 along the drive shaft extension 50*b*. This causes relative axial movement between the stacked antenna array 15 attached to the support collar 42 on the one hand, and the feed structure 20 slidably supported in collar 42 and attached to the base support 44 and thereby to the drive shaft 50 on the other. The drive shaft 50 is rotated, e.g., by use of a suitable tool such as a hex wrench 53 inserted into a socket formed in the end of the drive shaft housing 50*a* (see FIG. 2).

One end of an elongated angle indicator 55 is supported in aperture 42*e*. The other end of the elongated angle indicator 55 is appropriately marked, e.g., with phase angle or negative beam tilt angle, and can be observed through the outer shield of the radome (see FIG. 3).

The end of the inner feed element 24 terminates about midway along the length of stacked antenna array 15. The end of the inner feed element 24 is capacitively coupled to the adjacent radiating element 12 and connector 14. The position of the feed point corresponds to the end of the inner feed element 24 and is adjustable therewith as the stacked antenna array 15 and the feed structure 20 are moved axially relative to each other. In other words, the position of the feed point is a function of the relative axial position between the feed structure and the stacked antenna array.

Figure 8:
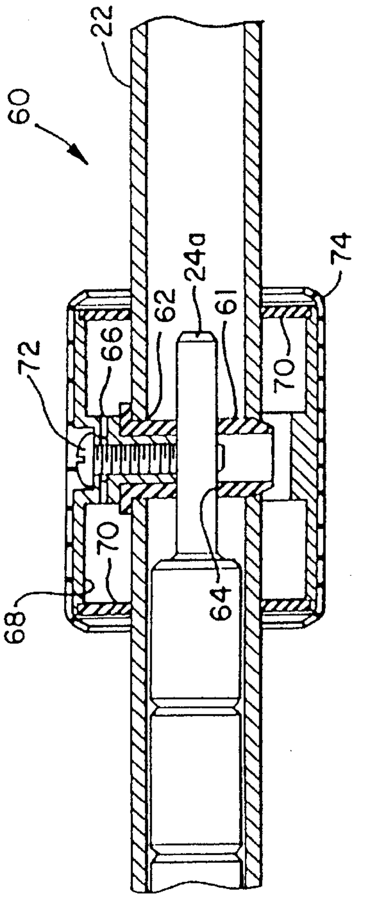
FIG. 8 is an enlarged partial view showing the adjustable coupling structure at the central feed point.
Figure 9:
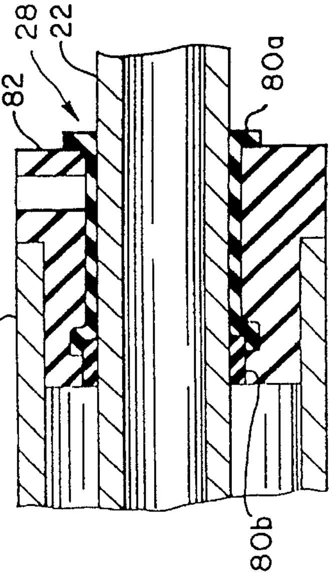
FIG. 9 is an enlarged view of the area identified by the lines 9—9 showing one of the end point coupling structures.

As shown in FIG. 8, the coupling assembly 60 for capacitively coupling the inner feed element to the stacked antenna array 15 includes a probe insulator 61 inserted radially through an aperture 62 formed in the wall of the outer annular feed element 22. The end 24*a* of the inner feed element 24 is inserted through an aperture 64 formed in the wall of the probe insulator 61. A conductive probe 66 is inserted into the probe insulator 61 into physical and electrical contact with the inner feed element 24. The probe insulator 61 electrically insulates the conductive probe 66 from the outer feed element 22 through which it passes.

A conductive coupling sleeve 68, spaced from the outer feed element 22 by non-conductive annular insulator members 70 surrounds the outer feed element 22 and includes an opening aligned with the conductive probe 66. A conductive fastener 72, such as a bolt, is threaded through the coupling sleeve 68 and the conductive probe 66 into the inner feed element 24. A non-conductive sheath 74 surrounds the coupling sleeve 68.

The coupling assembly is positioned within the stacked antenna array 15 in sliding engagement therewith to capacitively couple the inner feed element 24 to the adjacent conductive tubular portion 14 and radiating element 12 connected thereto.

The outer annular conductive feed element 22 is similarly capacitively coupled to the stacked antenna array 15 at additional points adjacent the ends of the array. The end caps 28 include an conductive feed element coupling structure which includes a dielectric sleeve elements 80*a* and 80 disposed around the outer feed element at positions adjacent either end of the radiating stacked antenna array 15. The end caps 28 also include conductive plugs 82 in electrical contact with conductive tubular portion 14, and electrically spaced from the outer feed element 22 by dielectric sleeve elements 80*a* and 80*b*. The conductive plugs 82 provide a large capacitance from the ends of the radiating structure to the outer feed element 22, which acts as an rf ground, while permitting slidable engagement therebetween.

As the radiator stacked antenna array 15 and the conductive feed structure 20 are adjusted axially with respect to each other by operation of the adjustable support and control mechanism 40, i.e., rotation the drive shaft 50 as described above, the feed structure and the capacitive coupling elements attached thereto shift axially in one direction or the other relative to the stacked antenna array 15. The compression spring 30 at the free end of the stacked antenna array 15 operates to maintain the relative position of the feed structure and the array.

Figure 6:
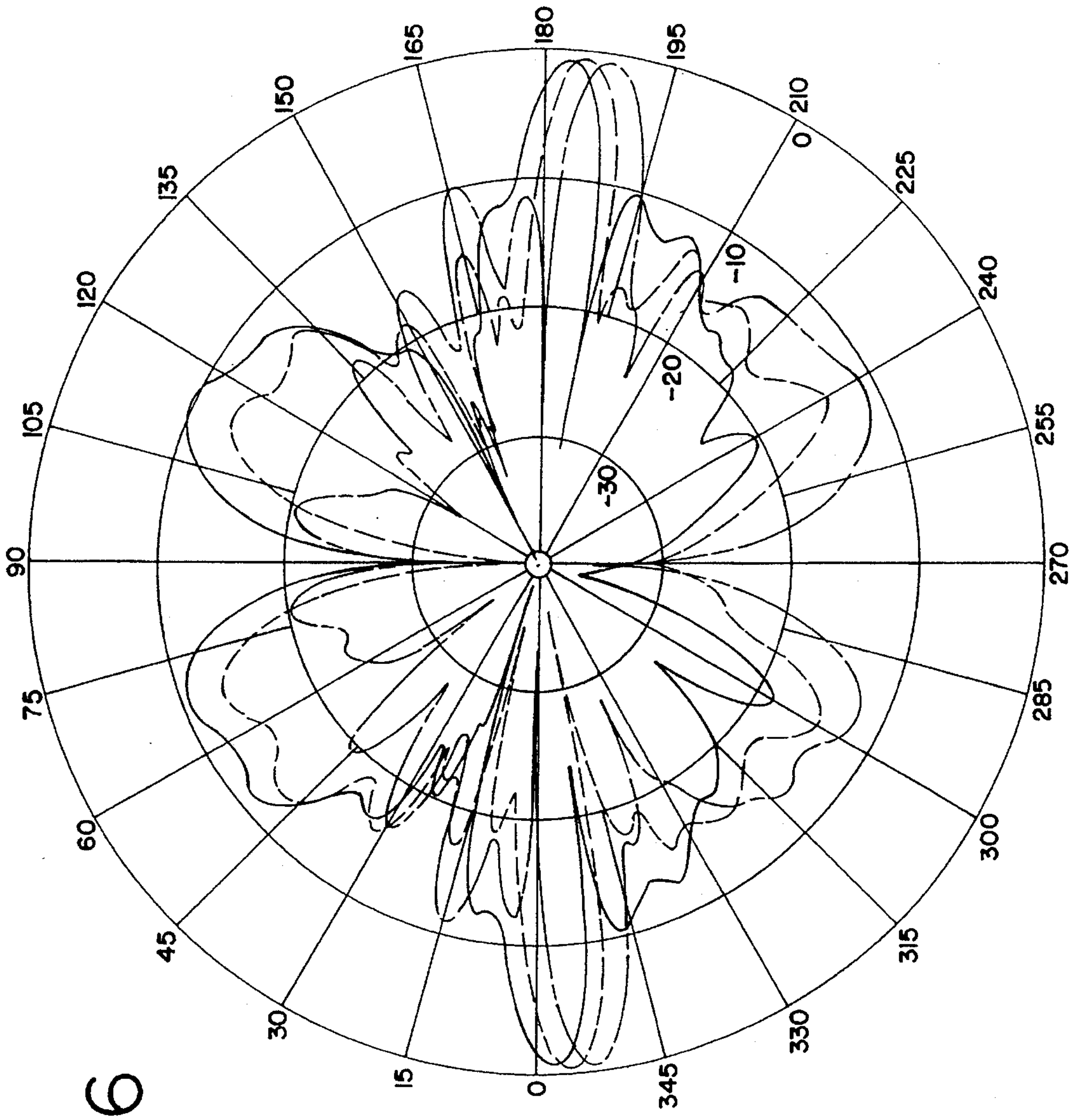
FIG. 6 is a radiation pattern showing the effect on beam angle deflection of the adjustment of the antenna feed point.

FIG. 6 shows exemplary radiation patterns produced at three different beam deflection angles achieved by adjustment of the antenna in accordance with the present invention. Radiation patterns at other angles may be achieved simply by adjusting the relative axial position of the feed structure and the stacked antenna array to other positions.

Thus there has been disclosed an adjustable beam tilt antenna capable of providing radiation pattern at a variety of beam angles, with the ability to conveniently and easily adjust the beam angle both prior to and after installation to accommodate different requirements for radiation patterns for different installations.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the appended claims.

What is claimed is:

1. An antenna assembly for producing a radiation pattern and capable of varying the beam angle of said radiation pattern comprising:

a plurality of substantially annular radiating members arranged end-to-end in a stacked array with one end of said array being a signal feed end;

signal feed means connectable to a signal feed line for coupling a signal between the feed line and said stacked array, said feed means including:

a co-axial feed structure having inner and outer conductive feed elements and extending through said annular radiating members of said stacked array from said signal feed end of said stacked array towards the other end thereof;

said inner conductive feed element having an end terminating at an adjustable feed point located between the opposite ends of said stacked array, and said outer conductive feed element extending substantially the entire length of said stacked array;

first means for nonconductively electrically coupling the end of said inner conductive feed element to an adjacent one of said radiating members at said feed point adjacent to the end of said inner conductive feed element; and additional means for nonconductively electrically coupling said outer conductive feed element to adjacent one of said radiating members of said stacked array at additional adjustable points adjacent the opposite ends thereof; and means for adjustably supporting said stacked array and said co-axial feed structure and permitting relative axial movement therebetween and the adjustment of the position of said adjustable feed point along said stacked array to thereby alter the beam angle of the radiation pattern.

2. An antenna assembly as claimed in claim 1 wherein:

said supporting means includes adjustment means connected between said stacked array and said feed structure for effecting selected relative axial movement therebetween.

3. An antenna assembly as claimed in claim 1 wherein:

said nonconductive coupling means includes first means for capacitively coupling said inner conductive feed element to said adjacent radiating member at said adjustable feed point.

4. An antenna assembly as claimed in claim 3 wherein:

said additional coupling means includes additional means for capacitively coupling said outer conductive feed element means to said adjacent radiating members at said additional adjustable points.

5. An antenna assembly as claimed in claim 4 wherein:

said capacitive coupling means slidably engage said adjacent radiating members for permitting relative axial movement therebetween and the resultant adjustment of the beam angle of the radiation pattern.

6. An antenna assembly as claimed in claim 5 wherein:

said first capacitive coupling means includes a substantially annular capacitive coupling member disposed adjacent to and spaced from the inner surface of said radiating member at said feed point and located externally of said second conductive feed element.

7. An antenna assembly as claimed in claim 6 wherein:

said first capacitive coupling means includes means conductively connecting said substantially annular coupling member to said inner conductive element including means for insulating said connecting means from said outer conducting element.

8. An antenna assembly as claimed in claim 1 wherein:

said supporting means includes means for biasing said stacked array and said feed structure for relative axial movement therebetween in a first direction.

9. An antenna assembly as claimed in claim 8 wherein:

said biasing means includes means resiliently connecting a non-feed end of said stacked array and the adjacent end of said outer feed element for resiliently urging said co-axial feed structure toward said non-feed end of said stacked array.

10. An antenna assembly as claimed in claim 9 including:

connecting means adjustably affixing the feed end of said stacked array to the adjacent end of said co-axial feed structure to effect selection and maintenance of the relative axial position between said stacked array and said feed structure.

11. An antenna assembly as claimed in claim 9 wherein:

said support means includes a first support member attached to the feed end of said feed structure, a second support member attached to the feed end of said stacked array, and adjustment means connected between said support members for effecting relative movement therebetween and relative axial movement between such stacked array and said feed structure.

12. An antenna assembly as claimed in claim 11 wherein said adjustment means is accessible for operation from the feed end of said antenna assembly.

13. An antenna assembly as claimed in claim 12 including indicator means attached to said stacked array and movable therewith for indicating the relative position of said feed points.

14. An antenna assembly as claimed in claim 12 including indicator means attached to said stacked array and movable therewith for indicating the resulting beam angle produced thereby.

15. An antenna assembly as claimed in claim 13 wherein said adjustment means includes a first elongated member connected to said first supporting member and to said conductive feed means;

a second elongated threaded member connected to said first elongated member, said second elongated member threadably engaging said second supporting member for effecting said relative axial movement thereof in response to rotation of said interconnected first and second elongated members.

16. An antenna assembly for producing a radiation pattern having a beam radiation angle and capable of varying the beam angle of said radiation pattern comprising:

an elongated dipole radiator assembly having two ends, one of said ends of said elongated dipole radiator assembly being a signal feed end;

signal feed means connectable to a signal feed line for coupling a signal between the feed line and said elongated dipole radiator assembly, said signal feed means including:

a feed structure having first and second conductive feed elements;

said first conductive feed element having an end located at an adjustable feed point between the opposite ends of said elongated dipole radiator assembly;

said second conductive feed element having portions located at additional adjustable points adjacent the opposite ends of said elongated dipole radiator assembly;

first coupling means for capacitively coupling the end of said first conductive feed element to said elongated dipole radiator assembly at said adjustable feed point; and additional coupling means for capacitively coupling said second conductive feed element to said elongated dipole radiator assembly at said additional adjustable points adjacent the opposite ends thereof; and adjustable support means for supporting said elongated dipole radiator assembly and said feed structure for relative movement therebetween to effect selective adjustment of the feed points of said capacitive coupling means along the length of said elongated dipole radiator assembly and thereby effecting adjustment of the beam angle of the radiation pattern.

17. An antenna assembly as claimed in claim 16 wherein said adjustable support means includes:

means connected to said feed structure and to said elongated dipole radiator assembly for effecting adjustment of the location of said feed point relative to said elongated radiating member.

* * * * *